(12) United States Patent
Burnap

(10) Patent No.: US 8,078,695 B2
(45) Date of Patent: Dec. 13, 2011

(54) MEDIA ON DEMAND USING AN INTERMEDIARY DEVICE TO OUTPUT MEDIA FROM A REMOTE COMPUTING DEVICE

(75) Inventor: Steven Burnap, Walnut Creek, CA (US)

(73) Assignees: Sony Corporation, Tokyo (JP); Sony Electronics, Inc., Parkridge, NJ (US)

( * ) Notice: Subject to any disclaimer, the term of this patent is extended or adjusted under 35 U.S.C. 154(b) by 351 days.

(21) Appl. No.: 12/174,587

(22) Filed: Jul. 16, 2008

(65) Prior Publication Data

US 2010/0017830 A1 Jan. 21, 2010

(51) Int. Cl.
*H04N 7/173* (2011.01)
(52) U.S. Cl. .......................... 709/219; 709/217; 709/224
(58) Field of Classification Search .................. 709/203, 709/219, 246, 200
See application file for complete search history.

(56) References Cited

U.S. PATENT DOCUMENTS

| | | | |
|---|---|---|---|
| 5,983,318 A | 11/1999 | Willson | |
| 6,262,708 B1 | 7/2001 | Chu | |
| RE37,600 E | 3/2002 | Weinger | |
| 6,813,690 B1* | 11/2004 | Lango et al. | 711/118 |
| 7,689,510 B2* | 3/2010 | Lamkin et al. | 705/51 |
| 2005/0162337 A1 | 7/2005 | Ohashi | |
| 2006/0031887 A1* | 2/2006 | Sparrell et al. | 725/78 |
| 2006/0069617 A1* | 3/2006 | Milener et al. | 705/14 |
| 2006/0161635 A1* | 7/2006 | Lamkin et al. | 709/217 |
| 2006/0232614 A1 | 10/2006 | Leroux | |
| 2007/0226344 A1* | 9/2007 | Sparrell et al. | 709/226 |
| 2010/0070628 A1* | 3/2010 | Harrang et al. | 709/224 |

FOREIGN PATENT DOCUMENTS

| | | |
|---|---|---|
| JP | 9114600 | 5/1997 |
| JP | 11143441 | 5/1999 |
| JP | 2003216140 | 7/2003 |
| WO | WO9854691 | 12/1998 |
| WO | WO9900785 | 1/1999 |
| WO | WO2005069148 | 7/2005 |

* cited by examiner

*Primary Examiner* — Wing Chan
*Assistant Examiner* — Tesfay Yohannes
(74) *Attorney, Agent, or Firm* — Trellis IP Law Group, PC

(57) ABSTRACT

Particular embodiments generally relate to providing media for display to a user. In one embodiment, the media may be stored on a remote computing device. An intermediary device may be used to display the media on an output device. Even though the media may be stored on the remote computing device, the user may believe that the media is stored on the intermediary device when displaying content using the intermediary device. Representations of the media units may be received at the intermediary device. The intermediary device automatically predicts which representations of the media may be most likely to be accessed by the user. When a request to access the media units is received, if the requested media unit is stored on the intermediary device, then it can be automatically displayed using the corresponding representation of the media unit.

15 Claims, 7 Drawing Sheets

MEDIA ON DEMAND USING AN INTERMEDIARY DEVICE TO OUTPUT MEDIA FROM A REMOTE COMPUTING DEVICE

BACKGROUND

Particular embodiments generally relate to data processing and more specifically to providing media on demand.

When viewing media using a device, the media typically has to reside on the device. For example, if media is stored on a remote device, the media is copied to the device using a copy and paste operation. The user can then view the media through the device. The user then explicitly requests that content is moved. The content may then be moved; however, this may not provide efficient media movement. Also, the device used to view the media may have certain limitations that may affect the viewing experience. For example, the device may have limited random access memory (RAM) and or disk space, and cannot store all the content the user wants to view. Also, moving the content from one device to the other may result in long load times as the data is transferred. Thus, to move media to a different device for display results in noticeable problems for the user.

SUMMARY

Particular embodiments generally relate to providing media for display to a user. In one embodiment, the media may be stored on a remote computing device. An intermediary device may be used to display the media on an output device. Even though the media may be stored on the remote computing device, the user may believe that the media is stored on the intermediary device when displaying content using the intermediary device. The media may be initially stored in media units on the remote computing device, such as in files. For example, a number of images, songs, videos, etc. may be stored as media units. Representations of the media units may be received at the intermediary device. The representations may be information for the media units. For example, the information may include data that is needed to display the media unit on the output device. The representations may also include thumbnail images that may be used to display thumbnail images on the output device for a user to view on a user interface; thus showing the user which media units can be accessed. In one embodiment, the representations of the media units may be scaled down versions that are compatible with a resolution of the output device.

The intermediary device automatically predicts which representations of the media may be most likely to be accessed by the user. These representations of media units most likely to be accessed may be requested by the intermediary device and received. The prediction and transfer is performed before a user explicitly requests the transfer. Thus, representations of all the media units may not be transferred to the intermediary device. However, thumbnail images for all the media units may be received so they can be displayed to the user in the interface. The thumbnail images are used to provide an interface that may show a list of the media units that may be accessed using the intermediary device. A list of media units is provided where some may be stored on intermediary device and some may be stored on the remote computing device. When a request to access the media units is received, if the requested media unit is stored on the intermediary device, then it can be automatically displayed using the corresponding representation of the media unit. However, if it is not, the intermediary device may request that the remote computing device stream the media unit or the output device, and the intermediary device can display the media unit on the output device.

A further understanding of the nature and the advantages of particular embodiments disclosed herein may be realized by reference of the remaining portions of the specification and the attached drawings.

DETAILED DESCRIPTION OF EMBODIMENTS

Figure 1:
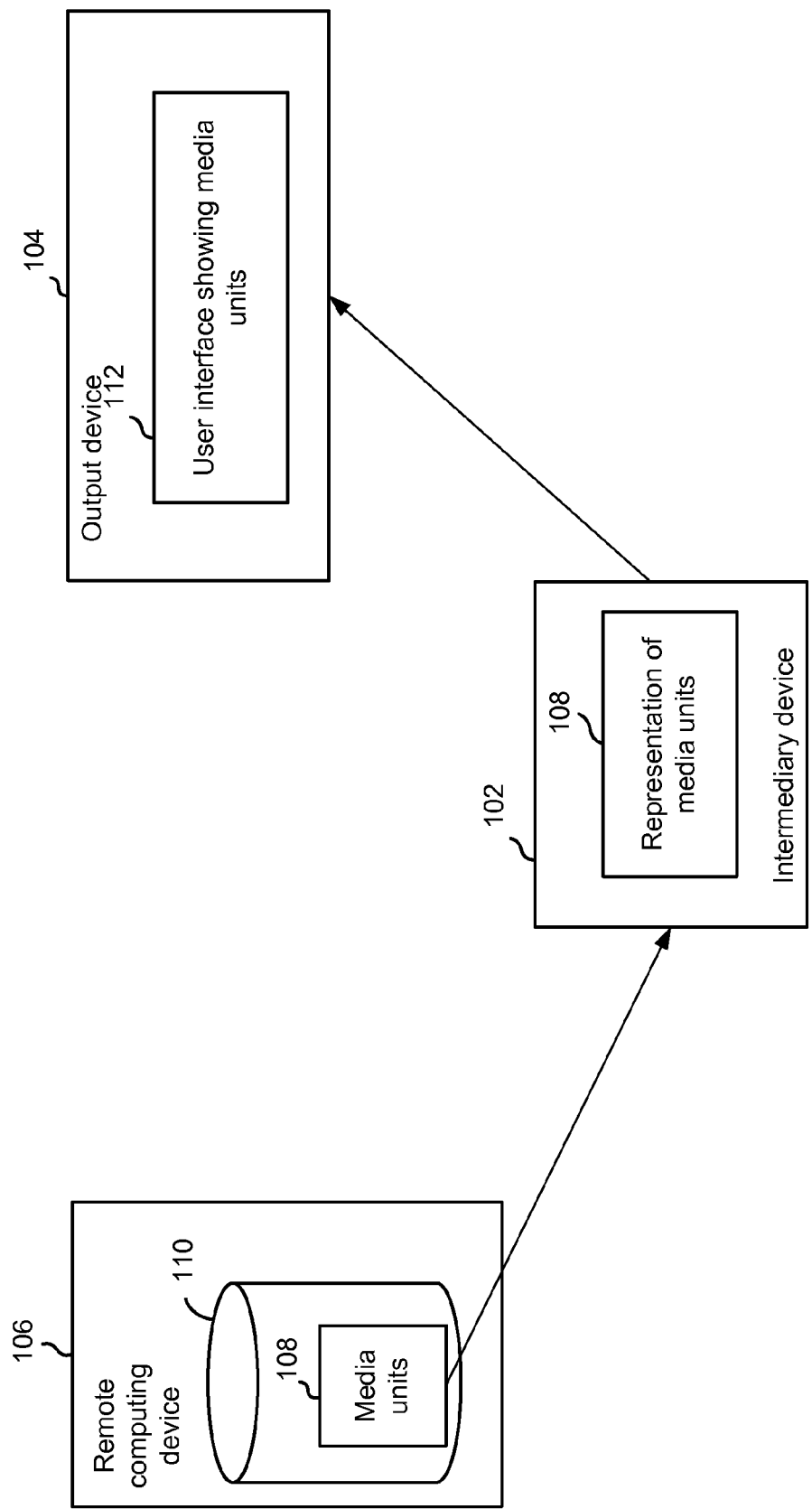
FIG. 1 depicts a simplified system for providing media according to one embodiment.

FIG. 1 depicts a simplified system 100 for providing media according to one embodiment. System 100 includes an intermediary device 102, an output device 104, and a remote computing device 106. It will be understood that other components of system 100 may be provided but are not shown, such as a networks interconnecting the components.

Remote computing device 106 may be any computing device that may store media units 108. Remote computing device 106 may be a personal computer, portable music player, portable memory device, such as a memory stick, personal digital assistant (PDA), cellular phone, or any other computing device that can store media units 108.

Media units 108 may be any media, such as audio, video, images, text, or any other data. Media units 108 may be organized in "units" and stored in storage 110. A unit may be any discrete unit of data. For example, a unit may be a file of an image; a file including a song or a video, etc. A media unit may be the information that is needed to output the media unit. For example, the media unit may be picture information that is needed to display a picture. Also, the media unit may include audio information that is needed to play a song or video information that is needed to display a video.

Intermediary device 102 may be any computing device that may be used to output representations of media units 108 on output device 104. For example, intermediary device 102 may be a game console, personal computer, media server, etc.

Intermediary device 102 receives representations of media units 108. The representations may be received through a network such as a wired network, wireless network, etc. The representations include data that is needed to output the media unit on output device 104. For example, the data needed to display an image may be part of the representation. When a representation is described, it may mean the information needed to output media unit 108. The representation may be an exact copy of the media unit, the media unit itself, a substantially similar copy of the media unit, etc. Also, the representation may be a scaled down version of the data stored on computing device 106. For example, if output device 102 has a lower resolution than the resolution of an image stored on remote computing device 106, then the resolution of the representation of the image may be scaled down to meet the representation of output device 104. The representation of media units may also include other representations, such as thumbnail images, that are created for images that have not been stored on intermediary device 102. This may allow the user to browse the user interface to see if there are media units that the user may want to access.

Output device 104 may be any output device. For example, output device 104 may be a display device, such as a television, monitor, etc. Output device 104 includes user interface 112, which can be a visual interface that allows a user to specify which media units he/she wants to access. In one embodiment, output device 104 may display images. Also, output device 104 may be a speaker that may output audio. Further, output device 104 may also render video.

Figure 2:
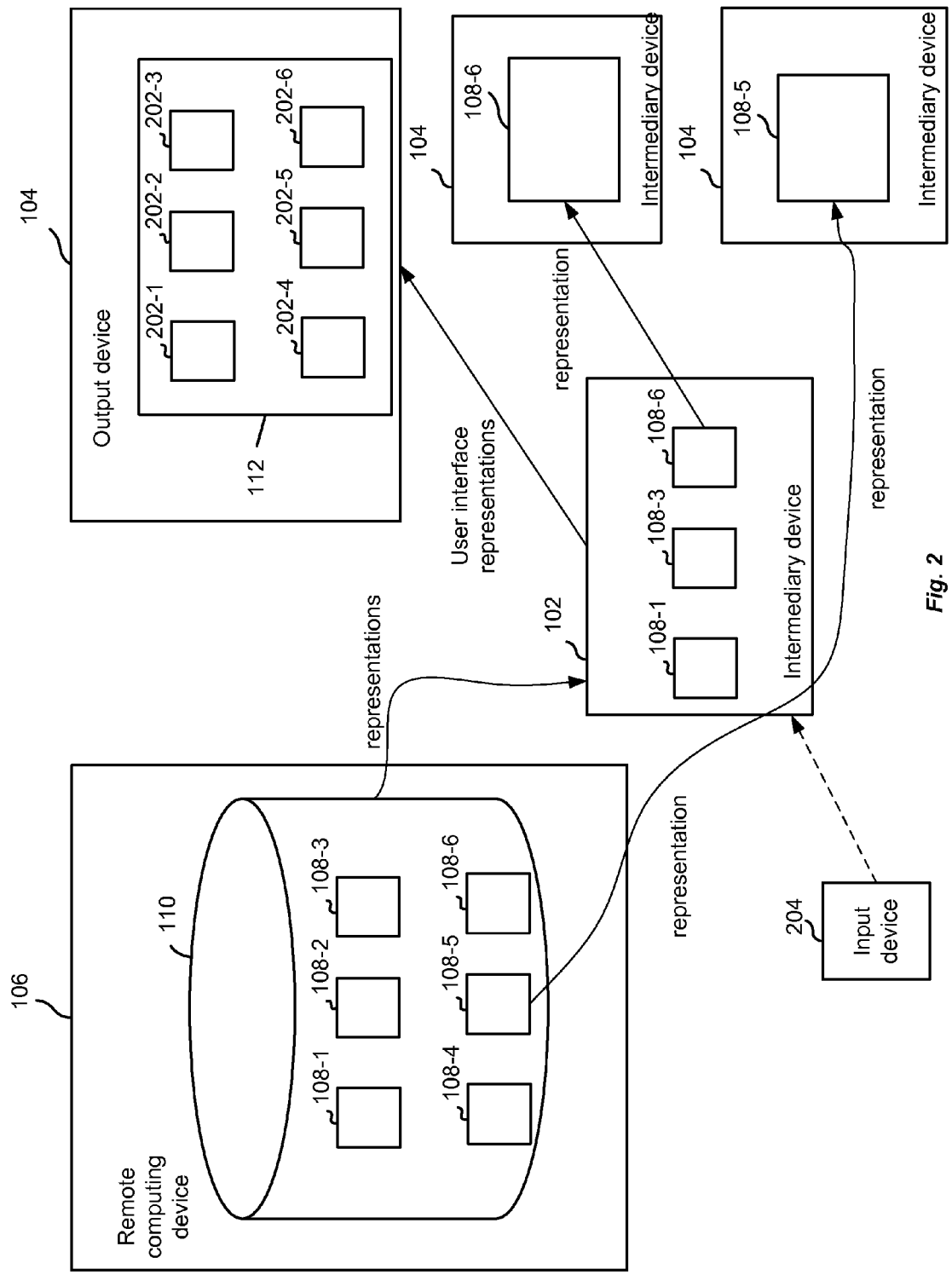
FIG. 2 depicts an example of outputting media units according to one embodiment.

The representation of media units 108 may be used to output media units on output device 102. FIG. 2 depicts an example of outputting media units 108 according to one embodiment. As shown, six media units 108 may be stored on remote computing device, which may send representations of one or more media units 108. The representations may include representations of the data for portions of media units 108. For example, data for media units 108-1, 108-3, and 108-6 may be sent to intermediary device 102. Data for media units 108-2, 108-4, and 108-5 may not be sent.

Particular embodiments may predict which media units 108 may be most likely to be accessed by a user. For example, heuristics may be used to determine which media units 108 should be cached on intermediary device 102. The heuristics may use historical statistics or any other intelligence. For example, it may be likely that a user may access the beginning and end of a list of images and thus these images may be cached on intermediary device 102. Further, if images have been modified on remote computing device 106, then they may be more likely to be accessed and thus may be sent to intermediary device 102. Accordingly, intermediary device 102 may determine which media units 108 may be most likely to be accessed and request them from remote computing device 106. The remote computing device may then send representations of the media units 108 to intermediary device 102. In addition to media units, other user interface representations 202 may be sent. The user interface representations may be thumbnail images or any other information that allows a user interface 206 to display a list of media units 108 that are found on remote computing device 106.

User interface 112 may display a list of media units 108 that can be accessed by a user. As shown, user interface representations 202 may be displayed for media units 108. User interface representations 202 may be a small representation of the images, such as a thumbnail image of videos/images that can be accessed, etc. For example, a video can be accessed, the first frame of the video or the title page of the video may be displayed. Also, if audio can be accessed, the name of the song may be displayed. Particular embodiments provide the illusion that all of media units 108 are stored on intermediary device 102. Thus, a user can use input device 204 to interact with intermediary device 102 to control user interface 112. For example, a user may select one of user interface representations 202 for accessing a corresponding media unit.

Input device 204 may be any input device that may control any media device 102, such as a remote control. Input device 204 may be used to select which media units to output. In one example, the user may select user interface representation 202-6 to access media unit 108-6. In this case, the representation of media unit 108-6 has been stored on intermediary device 102. Thus, intermediary device 102 may output the representation of media unit 108-6 on output device 104, as shown. Because the representation of media unit 108-6 is stored on intermediary device 102, the output is performed without delay.

The user may also select a user interface representation 202 for a media unit 108 that is not stored on intermediary device 102. For example, the user may select user interface representation 202-5. In this case, intermediary device 102 may cause a representation of media unit 108-5 to be streamed to output device 104. A request is sent to remote computing device 106 for media unit 108. The representation of media unit 108-5 may be streamed through intermediary device 102 to output device 104 and is output as shown. In other embodiments, intermediary device 102 may cause remote computing device 106 to stream the representation of media unit 108-5 directly to output device 104 without going through intermediary device 102. It should be noted that the streaming action may take longer to output the representation of media unit 108-5 than if it was stored on intermediary device 102.

Figure 3:
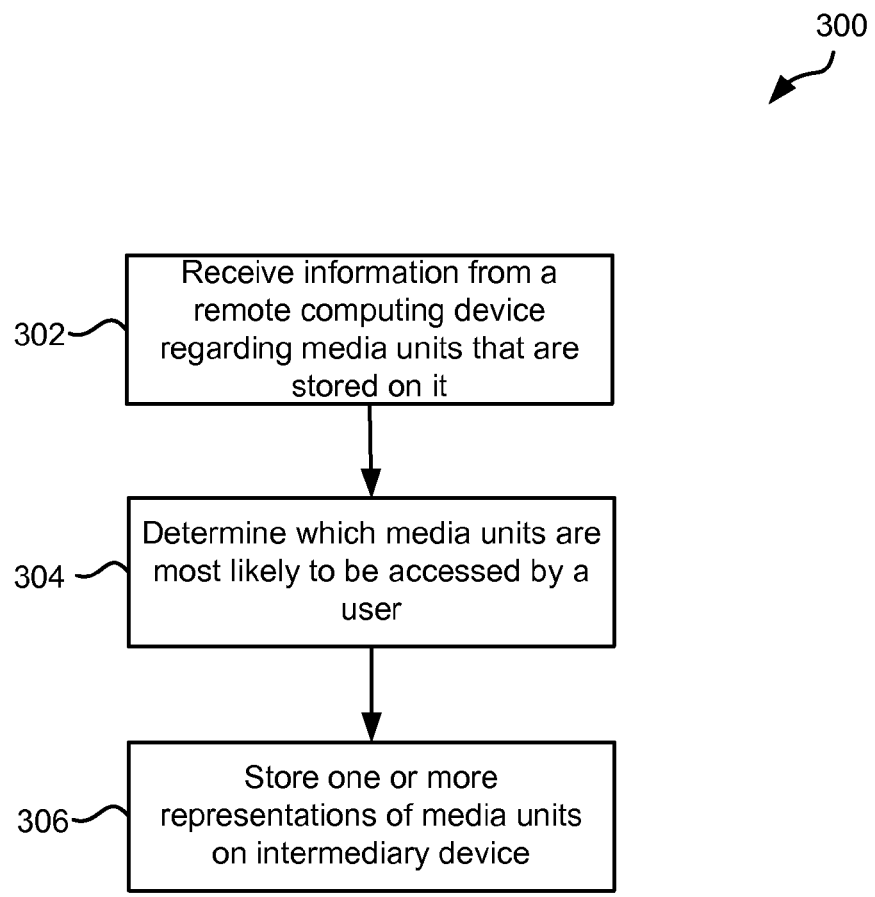
FIG. 3 depicts a simplified flowchart for determining which content to store on an intermediary device according to one embodiment.

The process of predicting which media units 108 may be accessed by a user will now be described in more detail. FIG. 3 depicts a simplified flowchart 300 for determining which content to store on intermediary device 102 according to one embodiment. Intermediary device 102, remote computing device 106, or another device may determine which content may be stored. In one embodiment, a determination is performed automatically without user input.

Step 302 receives information from remote computing device 106 regarding media units 108 that are stored on it. The information may be metadata that describes which media units 108 have been stored. The metadata may include information as to which files have been edited recently, which files have been stored recently, the ordering of files within a folder, identification information about the media units, or any other information.

Step 304 determines which media units 108 are most likely to be accessed by a user. For example, the metadata received may be processed using heuristics to determine which media units 108 may be most likely to be accessed. As described above, media units at the beginning and end of a list of media units, media units that have been most recently edited or stored on remote computing device 106 may be determined to be most likely to be accessed. Different examples of heuristics may be used. For example, historical data is used to determine the media units. For instance, if the user often looked at a picture before, he/she likely will again. User notes may be used, such as the user might add a "star" in the user interface to indicate an important picture. This may imply they think it better than other pictures, and therefore are more likely to look at it again. User actions with the media may be used. For example, if the user edits a picture (removing red-eye for instance), he/she are more likely to look at it again. Discovered preferences may be used that determine what a user likes to do with media. For instance, it may determined a user tends to look at pictures with detected faces more often than those without (for instance, family pictures vs. landscapes). The source of the picture may be used to determine media units from different sources are more likely to be looked at. For example, the user looks at pictures that are downloaded off of a personal camera more than pictures that he/she received by email.

Also, the storage capacity of intermediary device 102 and remote computing device 106 may be used to determine which media units 108 to transfer. In one sense, media units 108 may be shuffled around so that no one device has all of the data. That is, two devices want to be able to present a view to the user of 1000 photos, but neither device has the disk storage to hold 1000 photos. Particular embodiments move the images around so that each device only actually stores 500 full photos but all 1000 thumbnails so that each device appears to the user to contain all 1000 photos.

Step 306 stores one or more representations of media units 108 on intermediary device 102. The transfer of the representations of media units 108 may be performed before receiving an explicit user request to transfer those media units 108. For example, intermediary device 102 may determine which media units 108 may be most likely to be accessed and sends a request to remote computing device 106 for these media units. The request may also specify the output settings for output device 104. This may be the resolution that may be used to display media units 108. Remote computing device 106 may then send representations of the requested media units 108 to intermediary device 102. In one embodiment, the output specifications may be used to send the representations of media units 108, such as a scaled-down version based on the resolution of output device 104 may be sent for representations of media units 108. In other embodiments, the representations of media units 108 may include the full unit and intermediary device 102 may decide to scale down the version of the unit that is stored in cache. Once the representations of media units 108 have been stored on intermediary device 102, they may be accessed by a user.

Also, particular embodiments may generate new representations of media units 108 or transfer existing ones from other systems depending on which is more efficient. For example, a video game console may have a very fast processor, and is very good at resizing photos. On the video game console, it likely makes sense to transfer the original photo from a personal computer, generate a 1920×1200 high definition representation on the video game console and then discard the original. Conversely, on a slower device, it might make sense to generate a smaller version of 1920×1200 HD representation and transfer that. This determination may use performance metrics to determine the new representations that are desired.

Figure 4:
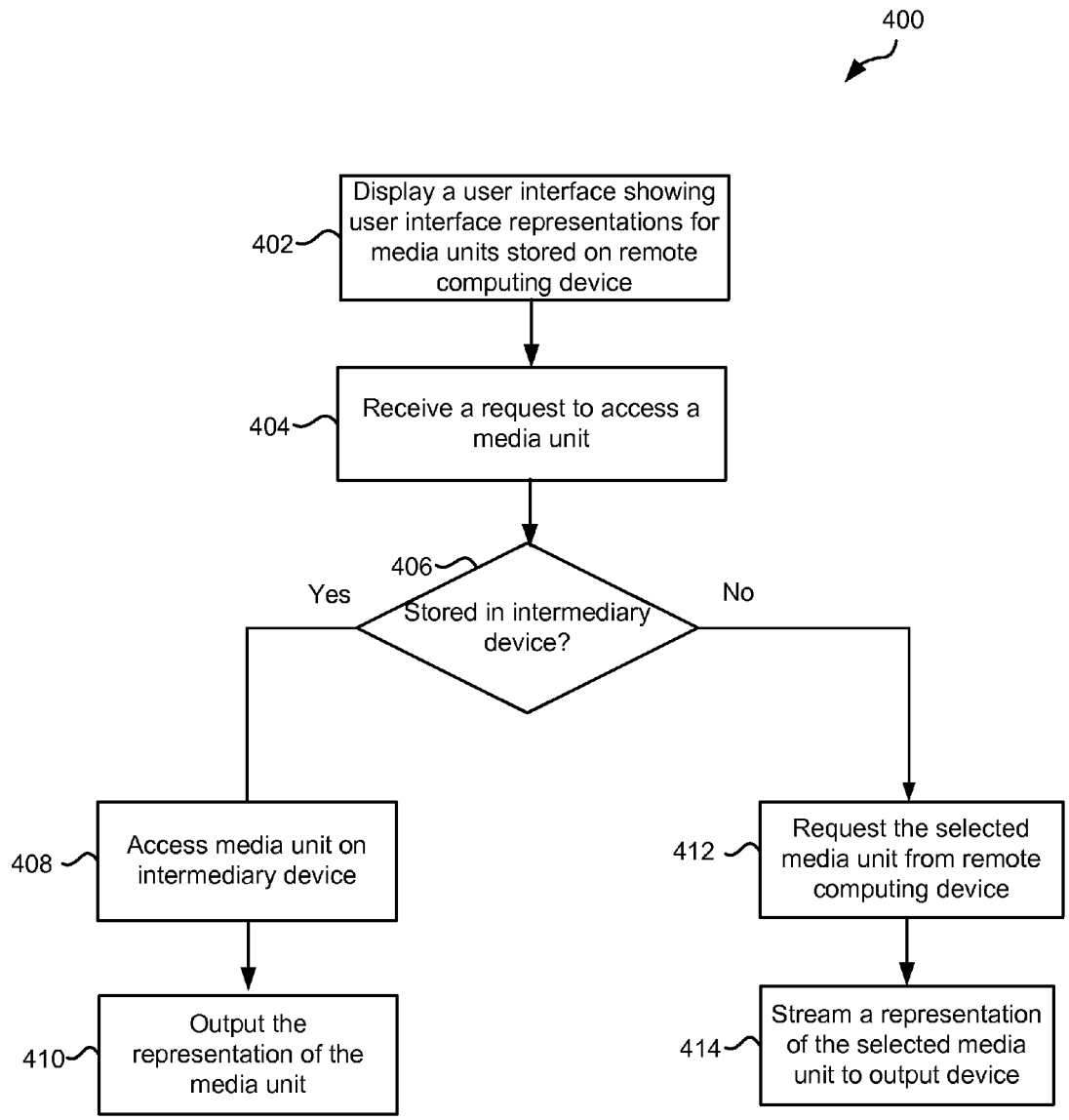
FIG. 4 depicts a simplified flowchart for providing access to media units 108 according to one embodiment.

FIG. 4 depicts a simplified flowchart 400 for providing access to media units 108 according to one embodiment. Step 402 displays a user interface 108 showing user interface representations for media units stored on remote computing device 106. For example, user interface representations 202 may have been received from remote computing device 106. These may include thumbnail images, text descriptions, or any other user interface representations 202 that may be used to show the user which media units may be accessed. User interface representations 202 may be small versions of the media units that are meant to be selected to access the media unit. For example, a thumbnail of a song is used to access the media unit to play the song.

The user may then browse the user interface to determine which media units to access. Step 404 receives a request to access a media unit 108. For example, input device 204 is used to select one of the user interface representations 202. The request is sent to intermediary device 102.

Step 406 then determines if a representation of the selected media unit 108 is stored in intermediary device 102. If the representation of media unit 108 is stored, such as in cache, then it is accessed in step 408. Step 410 then outputs the representation of the media unit. For example, a larger representation of the image may be displayed, the audio file may be played, the video may be rendered, etc.

If the representation of media unit 108 is not stored on intermediary device 102, in step 412, intermediary device 102 may request the selected media unit 108 from remote computing device 106. In step 414, a representation of the selected media unit 108 is streamed to output device 104. The streaming may be through intermediary device 102 or from remote computing device 106 directly to output device 104.

During operation, intermediary device 102 may re-sync with remote computing device 106 to store different representations of media units 108. For example, as new media units 108 are stored or changed on remote computing device 106, different media units 108 may be stored on intermediary device 102. Also, as users are accessing media units for output on output device 104, different representations of media units 108 should be stored on intermediary device 102.

Figure 5:
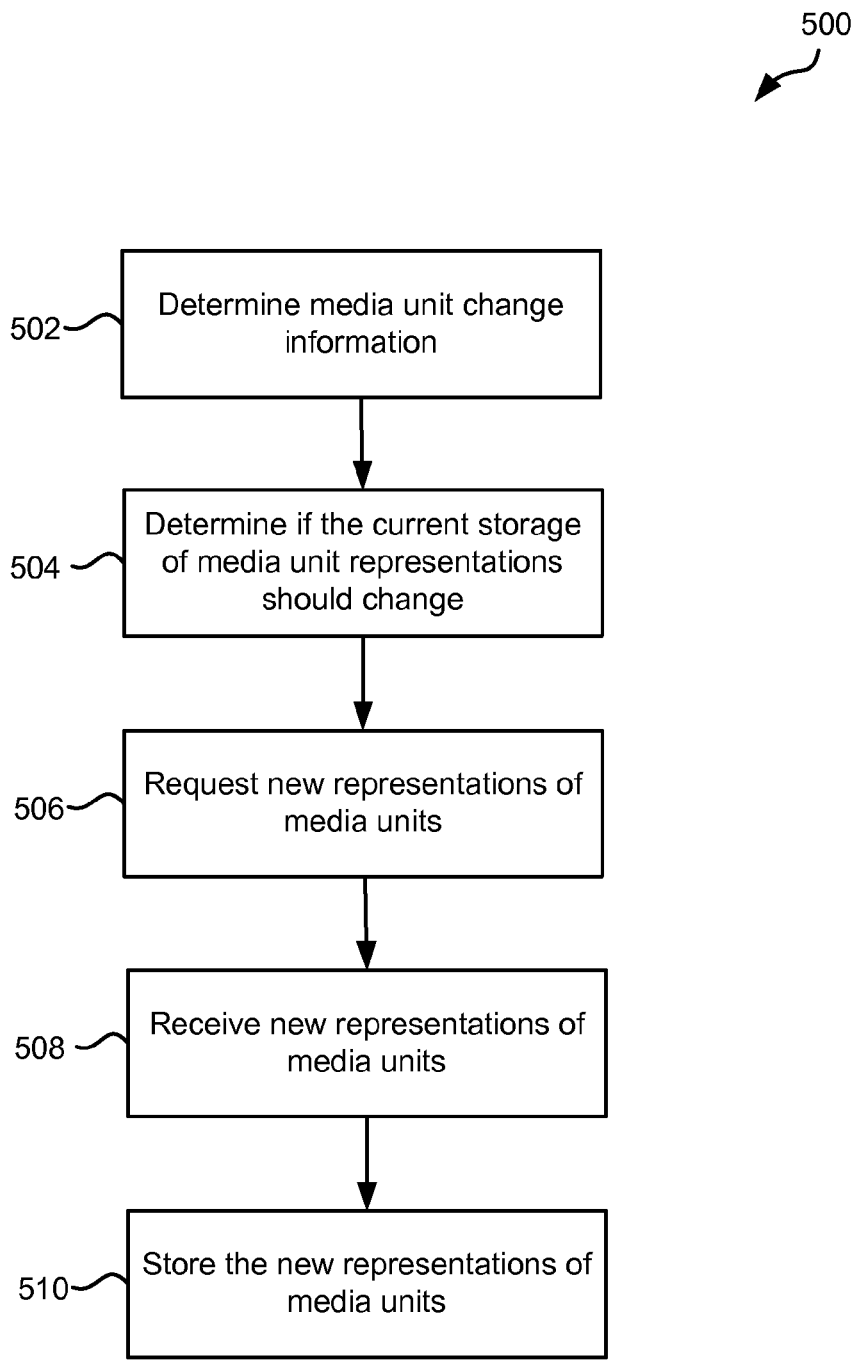
FIG. 5 depicts a simplified flowchart of a method for synching with remote computing device 106 according to one embodiment.

FIG. 5 depicts a simplified flowchart 500 of a method for synching with remote computing device 106 according to one embodiment. In step 502, intermediary device 102 may determine media unit change information. Intermediary device 102 may receive an indication of media units 108 that have changed at remote computing device 106. For example, remote computing device 106 may send metadata that indicates which media units 108 have been altered, which media units 108 have been deleted or added, etc. Also, the media unit change information may be determined based on which media units 108 are being selected for access by a user. For example, as a user accesses different media units, intermediary device 102 may determine that different media units should be stored on it.

In step 504, intermediary device 102 determines if the current storage of media unit representations should change. If so, in step 506, intermediary device 102 requests new representations of media units 108.

In step 508, intermediary device 102 receives new representations of media units 108. In step 510, intermediary device 102 can store the new representations of media units 108. In one embodiment, representations of media units 108 may be stored in a certain amount of storage. Thus, intermediary device 102 may decide if any media units 108 should be deleted from storage. For example, the representations of media units 108 that are least likely to be accessed may be deleted first.

Figure 6:
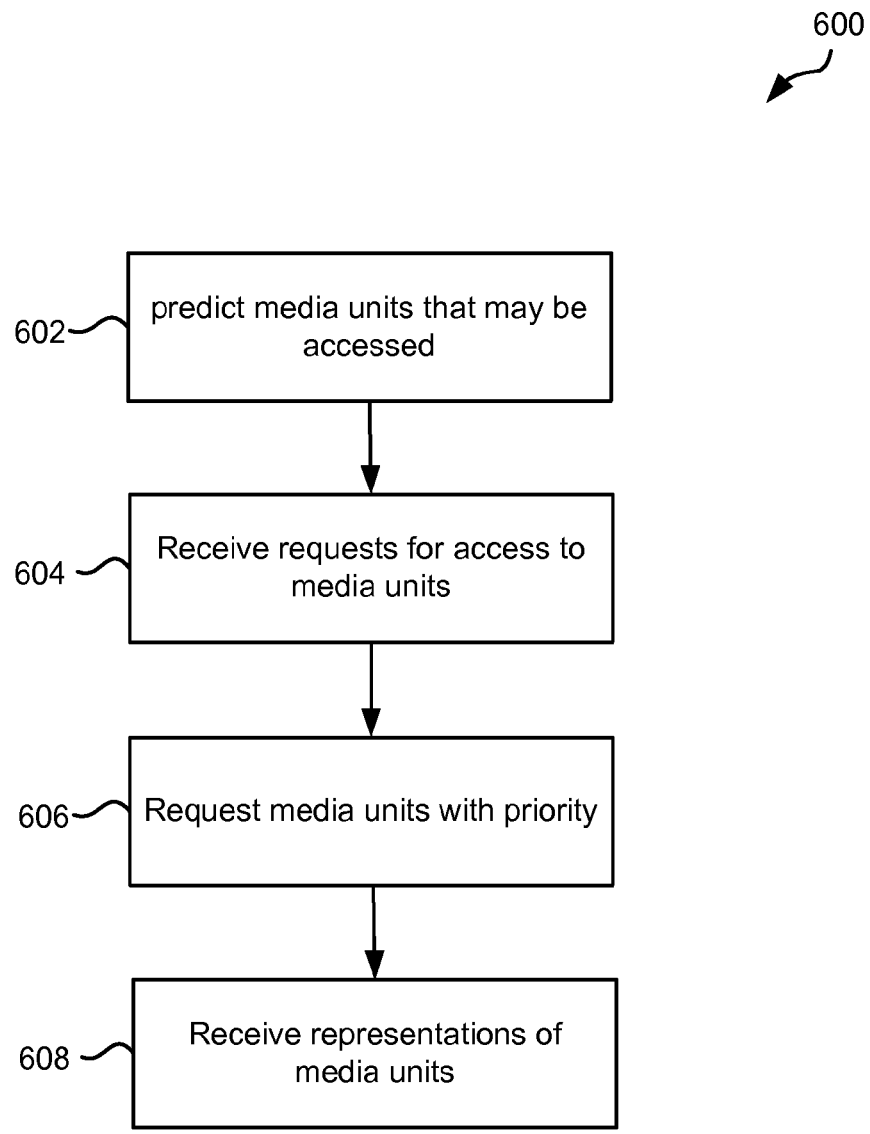
FIG. 6 depicts a simplified flowchart of a method for describing the interaction during access according to one embodiment.

During access, intermediary device 102 may be communicating with remote computing device 106 to either have representations of media units 108 streamed into output device 104 or to request representations of media units 108 to be stored on it for later use. FIG. 6 depicts a simplified flowchart of a method for describing the interaction during access according to one embodiment. In step 602, intermediary device 102 may predict media units 108 that may be accessed. Also, in step 604, intermediary device 102 may receive requests for access to media units 108. In some cases, the media units 108 may be stored on intermediary device 102 or may need to be requested for streaming from remote computing device 106.

In step 606, intermediary device 102 may request media units 108 with priority. For example, intermediary device 102 may assign a priority to the request based on what purpose the representation of media unit 108 will be used for. For example, if the media unit will be streamed to output device 104, then a high priority may be attached to the request. However, if the requested media unit is going to be stored on intermediary device 102, then a lower priority may be attached because it has not yet been accessed. Thus, higher priority is given to media units that have been selected by a user for access. This ensures that the user experience remains optimal in that the user may still believe that all media units 108 are stored on intermediary device 102.

In step 608, intermediary device 102 receives representations of media units 108. Intermediary device 102 may then store the representations of media units 108 and/or stream them to output device 104.

Figure 7:
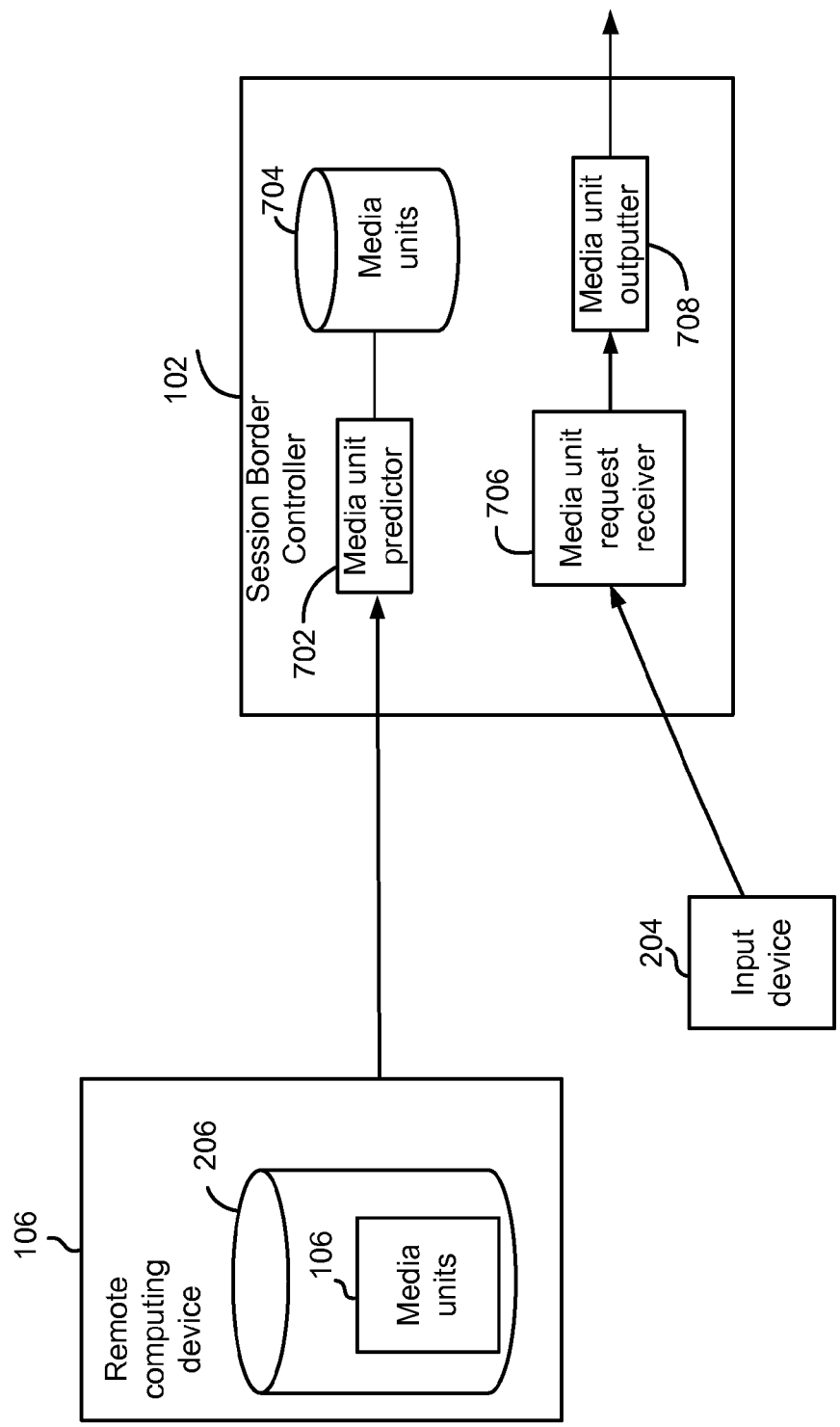
FIG. 7 depicts a more detailed embodiment of the intermediary device according to one embodiment.

FIG. 7 depicts a more detailed embodiment of intermediary device 102 according to one embodiment. A media unit predictor 702 is configured to predict which media units 108 may be most likely to be accessed by a user. Media unit predictor 702 may communicate with remote computing device 106 to request the media units 108. Also, media unit predictor 702 may perform synching as conditions change. Media unit predictor 702 may receive representations of media units 108 and store them in storage 704. Storage 704 may be cache memory, flash memory, read-only memory (ROM), a database, etc.

A media unit request receiver 706 is configured to receive input from a user, such as through an input device 204. Media unit receiver 706 processes the request and determines an action to be performed. For example, if the action is to output a media unit 108, a media unit output 708 is used to output a representation of media unit 108. For example, a representation of media unit 108 may be retrieved from storage 704 and outputted on output device 104.

Accordingly, particular embodiments provide the illusion that all media units 108 are stored on intermediary device 102. However, only a portion of media units 108 may be stored on intermediary device 102. A prediction system is used to determine the portion of media units 108 that are stored on intermediary device 102. A synching process automatically determines which media units 108 to store on intermediary device 102. Thus, a user does not need to perform copy and paste operations to transfer media units 108 between remote computing device 102 and intermediary device 102. Accordingly, the user experience is enhanced in that a user may browse an entire Although the description has been described with respect to particular embodiments thereof, these particular embodiments are merely illustrative, and not restrictive. Although media units are described, any information may be provided in media units.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A method for managing media, the method comprising:
receiving, at an intermediary device, information for media stored on a remote computing device, wherein the media comprises one or more of audio, video, images, and text;
automatically predicting one or more representations of the media to store on the intermediary device, the representations of the media determined based on a determination of which media may be accessed, wherein the representations of the media comprise representations that are scaled down from representations stored on the remote computing device, wherein scaled down representations comprise a first representation with less information than a second representation stored on the computing device, and wherein the representations of the media comprise one or more of images and text description;
receiving the representations of the media;
storing the representations of the media in storage on the intermediary device;
using the information to provide a user with an interface that shows a list of the media that may be accessed using the intermediary device;
receiving a request to access the representations of the media;
determining if the requested media is stored on the intermediary device; and
outputting the requested media from the storage on the intermediary device if the requested media is stored in the storage.

2. The method of claim 1, wherein the list shows the user that all representations of media can be accessed.

3. The method of claim 1, further comprising streaming the requested media from the computing device to an output device through the intermediary device if the requested media is not stored in the storage of the intermediary device.

4. The method of claim 1, wherein predicting comprises determining the one or more representations before an application is enabled to display the representations of media.

5. The method of claim 1, further comprising:
   determining when changes to the media on the computing device occur;
   determining if the one or more representations stored on the intermediary device should be changed; and
   requesting for additional representations of media if the one or more representations should be changed.

6. The method of claim 1, further comprising:
   receiving metadata for the media; and
   using heuristics to predict the one or more representations of the media to store on the intermediary device based on the metadata.

7. The method of claim 1, wherein the automatically predicting and receiving of the representations is performed before an explicit request from a user is received to transfer the representations.

8. An apparatus configured to manage media, the apparatus comprising:
   one or more processors; and
   logic encoded in one or more tangible media for execution by the one or more processors and when executed operable to:
   receive, at an intermediary device, information for media stored on a remote computing device, wherein the media comprises one or more of audio, video, images, and text;
   automatically predict one or more representations of the media to store on the intermediary device, the representations of the media determined based on a determination of which media may be accessed, wherein the representations of the media comprise representations that are scaled down from representations stored on the remote computing device, wherein scaled down representations comprise a first representation with less information than a second representation stored on the computing device, and wherein the representations of the media comprise one or more of images and text description;
   receive the representations of the media;
   store the representations of the media in storage on the intermediary device;
   use the information to provide a user with an interface that shows a list of the media that may be accessed using the intermediary device;
   receive a request to access the representations of the media;
   determine if the requested media is stored on the intermediary device; and
   output the requested media from the storage on the intermediary device if the requested media is stored in the storage.

9. The apparatus of claim 8, wherein the list shows the user that all representations of media can be accessed.

10. The apparatus of claim 8, wherein the logic when executed is further operable to stream the requested media from the computing device to an output device through the intermediary device if the requested media is not stored in the storage of the intermediary device.

11. The apparatus of claim 8, wherein logic operable to predict comprises logic when executed that is further operable to determine the one or more representations before an application is enabled to display the representations of media.

12. The apparatus of claim 8, wherein the logic when executed is further operable to:
    determine when changes to the media on the computing device occur;
    determine if the one or more representations stored on the intermediary device should be changed; and
    request for additional representations of media if the one or more representations should be changed.

13. The method of claim 8, further comprising:
    receiving metadata for the media; and
    using heuristics to predict the one or more representations of the media to store on the intermediary device based on the metadata.

14. The method of claim 8, wherein the automatically predicting and receiving of the representations is performed before an explicit request from a user is received to transfer the representations.

15. Software encoded in one or more non-transitory tangible media for execution by the one or more processors and when executed operable to:
    receive, at an intermediary device, information for media stored on a remote computing device, wherein the media comprises one or more of audio, video, images, and text;
    automatically predict one or more representations of the media to store on the intermediary device, the representations of the media determined based on a determination of which media may be accessed, wherein the representations of the media comprise representations that are scaled down from representations stored on the remote computing device, wherein scaled down representations comprise a first representation with less information than a second representation stored on the computing device, and wherein the representations of the media comprise one or more of images and text description;
    receive the representations of the media;
    store the representations of the media in storage on the intermediary device;
    use the information to provide a user with an interface that shows a list of the media that may be accessed using the intermediary device;
    receive a request to access the representations of the media;
    determine if the requested media is stored on the intermediary device; and
    output the requested media from the storage on the intermediary device if the requested media is stored in the storage.

* * * * *